(No Model.)
H. L. G. MEYER & L. CARRER.
BALL BEARING.
No. 553,588. Patented Jan. 28, 1896.
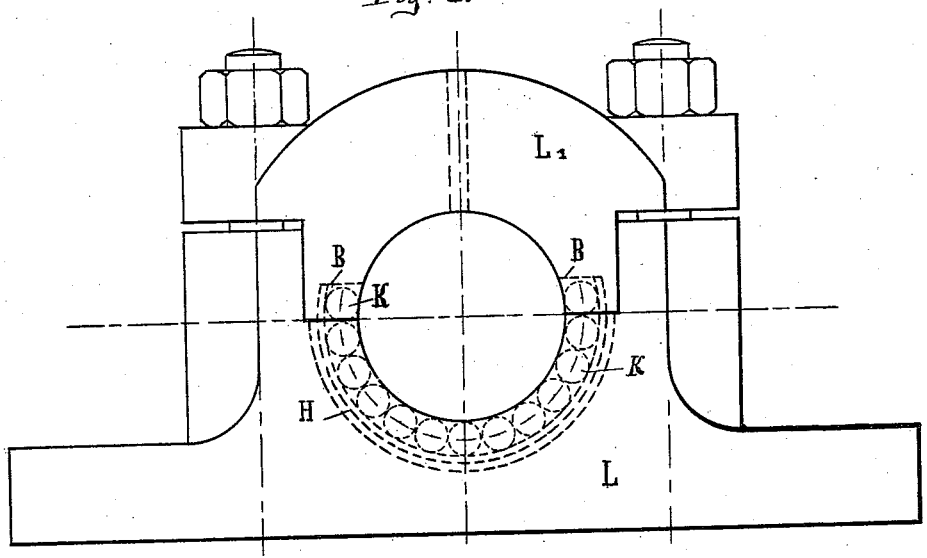
Fig. I.
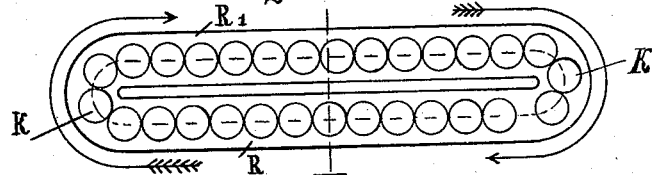
Fig. II.
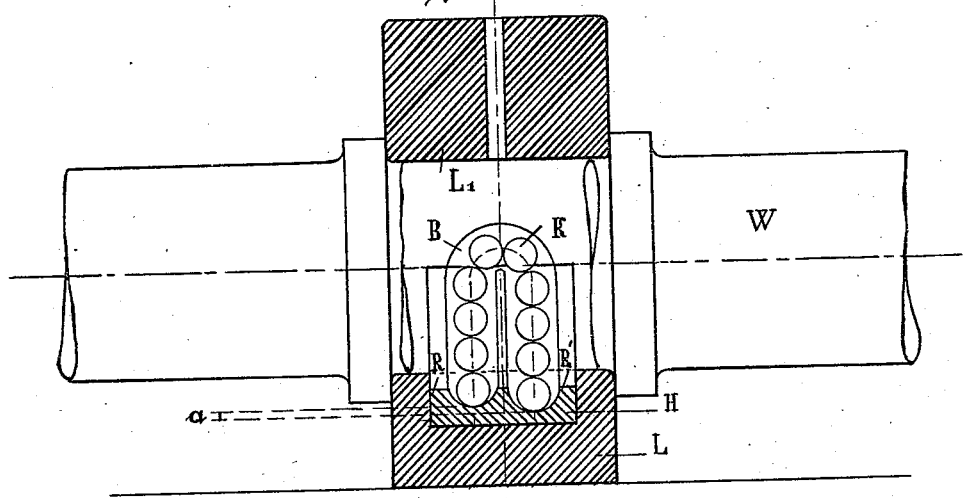
Fig. III.
Witnesses:
Frederick Seibel
William Schulz
Inventors:
Heinrich Ludwig Gustav Meyer &
Leo Carrer, per
Roeder & Briesen attorneys

UNITED STATES PATENT OFFICE.

HEINRICH LUDWIG GUSTAV MEYER AND LEO CARRER, OF DUSSELDORF, GERMANY; SAID CARRER ASSIGNOR TO SAID MEYER.

BALL-BEARING.

SPECIFICATION forming part of Letters Patent No. 553,588, dated January 28, 1896.

Application filed November 1, 1895. Serial No. 567,616. (No model.)

*To all whom it may concern:*

Be it known that we, HEINRICH LUDWIG GUSTAV MEYER and LEO CARRER, subjects of the German Emperor, residing at Dusseldorf, Germany, have invented certain new and useful Improvements in Antifriction Journal-Bearings, with description as follows.

This invention relates to an antifriction journal-bearing the bed of which has a continuous groove, portions of which run side by side partially around the shaft, and of which one portion under the shaft is lower than the other. Within this groove the antifriction-balls moving with the shaft take up the friction, while the return balls are out of contact with the shaft. In this way new surfaces of the balls are continually presented to the shaft, and uneven wear is prevented.

In the accompanying drawings, Figure 1 is an end view of our improved antifriction journal-bearing. Fig. 2 is a face view of the bed H; and Fig. 3 a vertical longitudinal section, partly in side view, of the journal-bearing.

The letter W represents the shaft received between the pillow L and the cap L' of the bearing. Into a seat of the pillow L there is fitted a hard-metal bed H, consisting of a semiannular plate which is held in place by the cap L'. The bed H is provided with a pair of grooves R R', connected at their ends by semicircular grooves B formed in the cap L'. Thus a continuous groove is formed, portions of which run side by side partially around the shaft. Of this groove the portion R' is lower than the portion R, as indicated by the letter *a* in Fig. 3. Within the continuous groove are placed a number of antifriction-balls K, which, by the revolution of the shaft, are made to travel along the groove as long as the shaft is revolved. The balls K in the shallow portion R of the groove will contact and move with the shaft, so as to constitute the antifriction-surface, while the balls in the deep portion R' of the groove will move out of contact with the shaft.

Of course the pillow and bed may be provided with two or more rows of our improved antifriction-bearings.

It will be seen that by our invention the antifriction-balls moving with the shaft greatly reduce the friction, and that as new surfaces of the balls are continually presented to the shaft uneven wear is prevented.

What we claim is—

The combination in an anti-friction journal bearing of a pillow and bed having a continuous groove, portions of which groove run side by side partially around a shaft, and one portion of which groove under the shaft is lower than the other, in order to prevent the return balls contacting with the shaft, together with the balls to move in said groove, substantially as set forth.

In testimony whereof we have signed this specification in the presence of two subscribing witnesses.

HEINRICH LUDWIG GUSTAV MEYER.
  LEO CARRER.

Witnesses:
  THEODOR GROTT,
  WM. ESSENWEIN.